United States Patent [19]

McCabe

[11] Patent Number: 5,031,268
[45] Date of Patent: Jul. 16, 1991

[54] CORNER GUARD ASSEMBLY

[75] Inventor: Harold M. McCabe, Richmond, Va.

[73] Assignee: E. I. Du Pont de Nemours and Company, Wilmington, Del.

[21] Appl. No.: 507,581

[22] Filed: Apr. 11, 1990

[51] Int. Cl.$^5$ ............................................. B65D 59/00
[52] U.S. Cl. ............................................. 16/2; 411/41
[58] Field of Search ................. 16/2, 383; 411/54, 41

[56] References Cited

U.S. PATENT DOCUMENTS

| | | | |
|---|---|---|---|
| 2,956,468 | 10/1960 | Macy | 16/2 |
| 3,169,899 | 2/1965 | Steuber | 161/72 |
| 3,366,000 | 1/1968 | Bennett | 411/41 |
| 4,869,454 | 9/1989 | Byrne etal. | 16/2 |
| 4,906,503 | 3/1990 | De La Cruz et al. | 428/81 |

FOREIGN PATENT DOCUMENTS 523866  4/1956  Canada ............................ 16/383

OTHER PUBLICATIONS

Du Pont Brochure E-64306 Entitled "Tyvek ®" Spun-bonded Olefin, a Guide to Converting, dated Apr., 1984.
KLM Trading Brochure entitled: "Hole-Guard".

*Primary Examiner*—Lowell A. Larson
*Assistant Examiner*—Carmine Cuda

[57] ABSTRACT

An improved corner guard assembly is provided for use in attaching suspension cords to the edgefold surface of a bonded nonwoven polyolefin film-fibril banner. The corner guard assembly comprises a pair of isosceles triangular plates, namely a front plate and a back plate. The two plates clamp a corner of the banner and are secured to each other by projections on the back plate which engage corresponding receptacles in the front plate. The projections have a generally tubular configuration in order to receive a detachably mounted locking peg for prohibiting relative movement of the projections in the receptacles. The improvement comprises mounting the locking pegs on the front plate so that they extend partly into the cavity defined by the receptacles. During use, the pegs can be driven into the projections without danger of bending or breaking.

12 Claims, 1 Drawing Sheet

CORNER GUARD ASSEMBLY

FIELD OF THE INVENTION

The present invention relates to an improved corner guard assembly for use with indoor and outdoor advertising banners. In particular, the invention relates to an improved corner guard assembly for use with banners manufactured from bonded non-woven polyolefin film-fibril sheets.

BACKGROUND OF THE INVENTION

Bonded non-woven sheets of polyolefin film-fibrils of the type disclosed in Steuber, U.S. Pat. No. 3,169,899 are useful as banners such as those designed for indoor and outdoor advertising. A commercial polyethylene film-fibril sheet product sold by E. I. du Pont de Nemours and Company under the trademark TYVEK ® is particularly suitable for such applications. TYVEK ® bonded non-woven polyethylene film-fibril sheets are lightweight and have outstanding mechanical properties while also having good tolerance to ordinary weather conditions.

However, banners manufactured from bonded non-woven polyethylene film-fibril sheets have some deficiencies. To make a typical rectangular banner, having a width substantially greater than its height, the top and bottom of a sheet panel are folded over, a rope is placed inside the fold, and the folded edge is stitched to form a seam. In addition, each end of a typical banner is also seamed. The banner is then hung by suspending it between the two ropes. Since the ropes stretch with time, the banner eventually wrinkles, detracting from its appearance. More importantly, the slack in the ropes and the banner provides an opportunity for wind to catch the banner, whipping it back and forth. This condition can weaken the fabric and eventually cause the seams to break and come apart. Although the film-fibril sheet is relatively strong, the needle holes through the sheet can initiate a tear which can propagate and result in the destruction of the banner.

Another suspension technique for hanging banners is to use single rings or grommets in each respective corner. This technique allows the banner to be supported by ropes attached to the corners. This technique works for small, lightweight banners which are not greatly affected by wind. For larger, outdoor banners, the grommets typically tear out of the banner corners since the grommets do not grip the sheet well and do not grip a sufficient area of the banner. As a result, all of the stress from the suspension system is concentrated on the respective holes. Ultimately, this leads to damage or even loss of the banner.

An alternative to rings and grommets is to provide a corner clamping device for contacting a sufficient area of the front and back edgefold surfaces of the banner. This technique distributes the stress from the suspension system over a large enough area of the banner so that the stress is not concentrated on the corner holes. Such a suitable clamping device is disclosed in De La Cruz et al., U.S. Pat. No. 4,906,503, the contents of which are incorporated herein by reference. In the preferred embodiment, the clamping device disclosed by De La Cruz et al. includes two isosceles triangular plates, each having a right angle to conform to the corner of the rectangular banner, which clamp the edgefold therebetween. The triangular plates are attached to each other by a ribbon hinge and arranged on either side of the edgefold in alignment with each other. The two legs of the triangle are aligned with and spaced-apart from the edges of the corner of the banner. The two plates are secured together for clamping the banner edgefold therebetween by means of a number of projections on the first plate which engage corresponding receptacles in the second plate.

The projections have a generally tubular configuration with a semi-circular lip at their outermost tip. A corresponding annular recess is provided in the inner wall of the receptacles so that the lip on the projections is received into and engaged by the annular recess to secure the projections in the receptacles. In order to provide for easier engagement of the projections into the receptacles, a V-shaped split is provided on diametrically opposed sides of the projections which allows for relative movement of the semi-circular lip of the projections defined by the split.

To further secure the projections in the receptacles, locking pegs are driven into each of the tubular projections to prevent the relative movement of the semi-circular lip of the projections once the projections have engaged the annular recess of the receptacles. The locking pegs are molded to the outer surface of the receptacle plate and do not protrude into the cavity defined by the receptacles. The plates also have corresponding bores to provide an opening for admitting a cord or other means for hanging the banner.

A failing of the aforementioned device is that the locking pegs terminate at the top of the receptacle cavity, thereby necessitating a pin guard to be used so as to prevent bending of the pin when driven with a hammer. Typically, if the pegs are hit off center, the pegs will bend or break before they can be inserted into the tubular projections. Clearly, what is needed is a corner clamping device wherein the locking pegs can be driven into the tubular projections without danger of bending or breaking. It is therefore an object of the present invention to provide a corner guard assembly for clamping to the corners of banners which does not have the problems inherent in the prior art.

Other objects and advantages of the invention will become apparent to those skilled in the art upon reference to the annexed drawings and to the detailed description of the invention which hereinafter follows.

SUMMARY OF THE INVENTION

In accordance with the invention, there is provided an improved corner guard assembly for use with indoor and outdoor advertising banners. The corner guard assembly comprises a front plate and a back plate which are adapted to conform to a corner of a banner. The plates are secured together for clamping the banner corner by a plurality of tubular projections on the front plate which engage corresponding receptacles in the back plate. A plurality of locking pegs are detachably mounted to the back plate for insertion into the bore of the tubular projections of the front plate when in use. The pegs lock the projections into the receptacles. The improvement comprises mounting the locking pegs such that the leading tip of the pegs protrudes partly into the cavity defined by the receptacles.

BRIEF DESCRIPTION OF THE PREFERRED EMBODIMENT

DETAILED DESCRIPTION OF THE DRAWINGS

Figure 1:
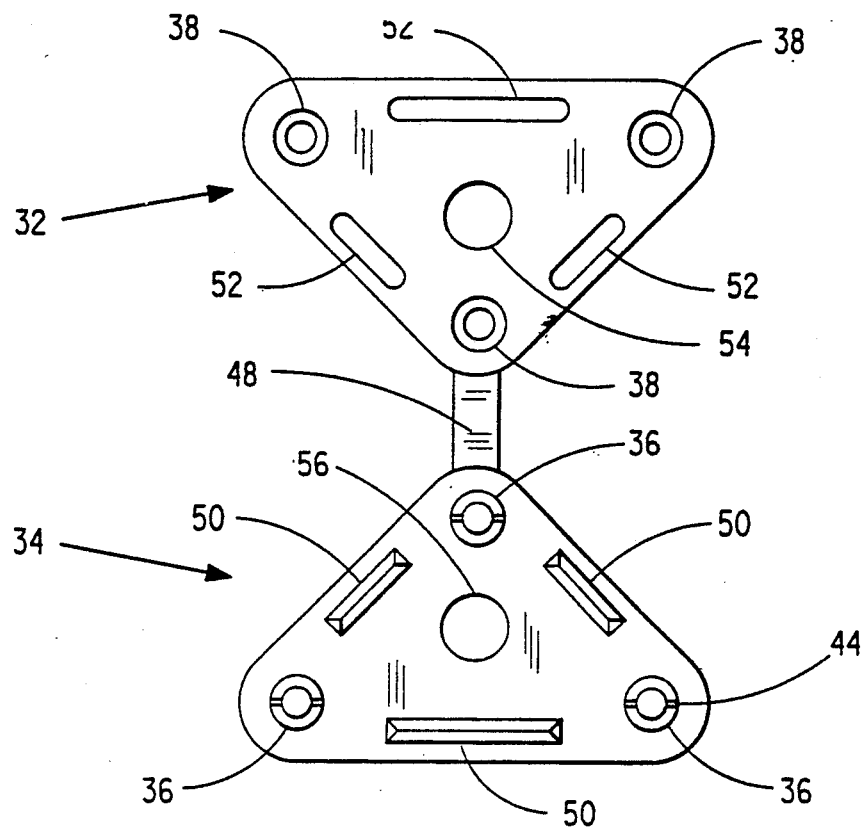
FIG. 1 is a plane view of a preferred corner guard assembly according to the invention before attachment to a banner.

Referring now to the drawings, wherein like reference numerals designate like elements, a preferred embodiment of the improved corner guard assembly in accordance with the present invention is shown in FIG. 1.

FIG. 1 illustrates a preferred corner guard assembly which provides sufficient clamping area on an edgefold surface 28 of a banner 12 to resist tearing. Preferably, the banner 12 is manufactured from bonded non-woven polyolefin film-fibril material and the corner guard assembly is sized so that a clamping area of at least 5 cm$^2$ (0.78 in$^2$) is provided. In the preferred embodiment illustrated in FIG. 2, the corner guard assembly comprises two isosceles triangular plates having a right angle to conform to the corner of a rectangular banner which clamp the edgefold 28 therebetween. For purposes of illustration, the plate contacting the front banner surface will be referred to as the front plate 32 and the plate contacting the edgefold area of the back surface of the banner will be referred to as the back plate 34, although it will be understood that their relative positions can be interchanged.

Figure 2:
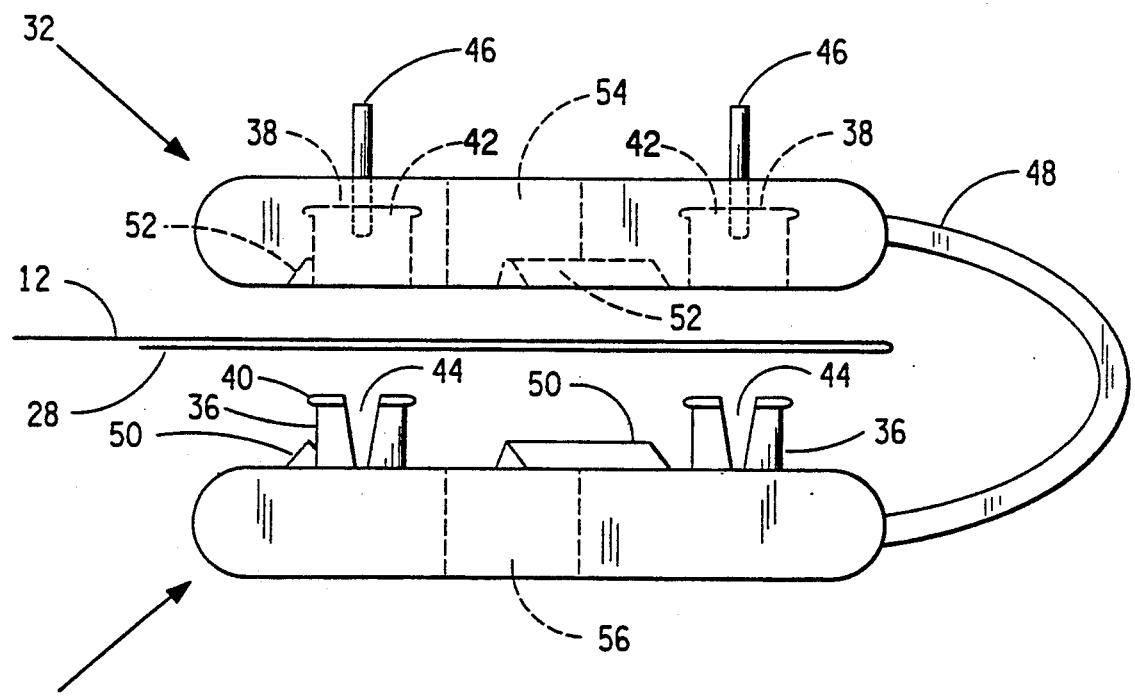
FIG. 2 shows the preferred corner guard assembly of FIG. 1 being installed on an edgefold of the banner.

In use, triangular plates 32 and 34 are arranged on either side of the banner edgefold 28 in alignment with each other with the two legs of the triangle aligned with and spaced-apart from the edges of the banner corner. The two plates are secured together for clamping the banner edgefold 28 by means of three projections 36 on the back plate 34 which engage three corresponding receptacles 38 in the front plate 32. The projections 36 have a generally tubular configuration with a semi-circular lip 40 at the outermost tip of the projections. As illustrated in FIG. 2, a corresponding annular recess 42 is provided in the inner wall of the receptacles 38 so that the lip 40 on the projections 36 is received into and engaged by the annular recess 42 to secure the projections 36 in the receptacles 38.

In order to provide for easier engagement of the projections 36 into the receptacles 38, a V-shaped split 44 is provided on diametrically opposed sides of the projections 36 which allows for relative movement of the semi-circular lip 40 of the projections defined by the split. As illustrated in FIG. 2, the projections 36 are locked into the receptacles 38 by driving locking pegs 46 into the tubular projections 36 to prevent the relative movement of the semi-circular lip 40 of the projections. The locking pegs 46 are detachably mounted on the front plate 32 and protrude partly into the cavity defined by the receptacles 38. Preferably, the locking pegs 46 protrude into the cavity of the receptacles 38 at least about 0.32 cm (⅛ in). Most preferably, the locking pegs 46 extend at least one quarter of the way into the cavity of the receptacles 38 and are tapered or rounded at their leading tip. This configuration allows the locking pegs 46 to be easily driven into the tubular projections 36 without danger of bending or breaking when being struck by a hammer or other driving means.

Preferably, back plate 34 is further provided with ribs 50 and front plate 32 is provided with corresponding troughs 52 for receiving the ribs 50 when clamped onto the edgefold 28 of the banner 12. The ribs 50 and troughs 52 provide firmer engagement with the banner 12 for more secure clamping. As illustrated, the corner guard assembly is provided with bores 54 and 56 which provide an opening through the front plate 32 and back plate 34, respectively, to admit a cord or other means for hanging the banner.

Preferably, the front plate 32, the back plate 34 and associated mechanisms are provided as a unitary, injection-molded fabrication which includes a ribbon hinge 48 to keep the front plate 32 and the back plate 34 with each other before use. In the preferred embodiment, the assembly is fabricated from polyethylene or polypropylene although the precise material is not critical to the invention. The locking pegs 46 are molded onto the front plate 32, as shown with a tear-away attachment point, so that they are in position to be safely driven into the bore of the tubular projections 36 without danger of bending or breaking. It has been found that when the length of the legs of of the triangular plates is about 4.4 cm (1¾ in), the corner guard assembly provides ample clamping area for distributing the suspension stresses. It will be understood that for a corner guard assembly of the type described above, it is necessary to punch holes through the edgefold 28 of the banner 12 so that the projections 36 can extend therethrough. In a like manner, a hole must be punched through the edgefold 28 which corresponds with bores 54 and 56.

Although a particular embodiment of the present invention has been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the present invention.

I claim:

1. An improved corner guard assembly for clamping to a corner of a banner comprising:
   (a) a front plate adapted to conform to the corner of the banner and having a plurality of tubular projections extending therefrom;
   (b) a back plate adapted to conform to the same corner of the banner and having a plurality of corresponding receptacles to engage the projections of the front plate; and
   (c) a plurality of locking pegs detachably mounted to the back plate by a tear-away attachment point for insertion in the tubular projections of the front plate when driven by a driving means, the improvement comprising mounting the pegs to the back plate such that the pegs protrude at least one quarter of the way into the cavity defined by the receptacles before insertion of the pegs in the tubular projections, whereby the locking pegs can be easily driven into the tubular projections without danger of bending or breaking when struck by the driving means.

2. A corner guard assembly according to claim 1 wherein the front and back plates have corresponding bores therethrough for receiving means for hanging the banner.

3. A corner guard assembly according to claim 1 further comprising means for maintaining the front and back plates as a unitary assembly.

4. A corner guard assembly according to claim 3 wherein the means comprises a ribbon hinge.

5. A corner guard assembly according to claim 1 wherein the front and back plates are shaped in the form of isosceles triangles.

6. A corner guard assembly according to claim 1 further comprising a plurality of ribs on the front plate which engage corresponding troughs on the back plate in order to clamp the banner therebetween.

7. A corner guard assembly according to claim 1 wherein the tubular projections are further provided with a V-shaped split on diametrically opposed sides of the projections.

8. A corner guard assembly according to claim 7 wherein the tubular projections are further provided with a semi-circular lip at the outermost tip of the projections and the receptacles are provided with a corresponding annular recess in the inner wall of the receptacles such that the lip on the projections is received into and engaged by the annular recess of the receptacles.

9. A corner guard assembly according to claim 1 wherein the assembly is provided as a unitary, injection-molded fabrication which further comprises a ribbon hinge for connecting the front and back plates.

10. A corner guard assembly according to claim 9 wherein the assembly is fabricated from a member selected from the group consisting of polyethylene and polypropylene.

11. A corner guard assembly according to claim 1 wherein the banner clamping area provided by the assembly is at least about 5 cm$^2$.

12. A corner guard assembly according to claim 1 wherein the locking pegs are tapered or rounded at their protruding end.

* * * * *